(12) United States Patent
Claeson et al.

(10) Patent No.: US 9,930,582 B2
(45) Date of Patent: Mar. 27, 2018

(54) DETERMINATION OF NETWORK ENVIRONMENT

(71) Applicant: Telefonaktiebolaget LM Ericsson (publ), Stockholm (SE)

(72) Inventors: Gustaf Claeson, Lund (SE); Chao Gong, Beijing (CN); Bela Rathonyi, Lomma (SE); Jian Cheng Sun, Beijing (CN)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 36 days.

(21) Appl. No.: 15/039,031

(22) PCT Filed: Nov. 29, 2013

(86) PCT No.: PCT/EP2013/075095
§ 371 (c)(1),
(2) Date: May 24, 2016

(87) PCT Pub. No.: WO2015/078517
PCT Pub. Date: Jun. 4, 2015

(65) Prior Publication Data
US 2017/0041840 A1    Feb. 9, 2017

(51) Int. Cl.
*H04W 36/00* (2009.01)
*H04W 48/08* (2009.01)
(Continued)

(52) U.S. Cl.
CPC .......... *H04W 36/0061* (2013.01); *H04L 5/14* (2013.01); *H04W 48/08* (2013.01);
(Continued)

(58) Field of Classification Search
CPC ..... H04W 24/10; H04W 88/02; H04W 28/16; H04W 36/0061; H04W 48/18; H04W 72/04; H04W 36/14; H04W 99/00
(Continued)

(56) References Cited

U.S. PATENT DOCUMENTS

2008/0318577 A1* 12/2008 Somasundaram ........................ H04W 36/0066
455/436
2012/0040687 A1* 2/2012 Siomina ................ G01S 5/0205
455/456.1
(Continued)

FOREIGN PATENT DOCUMENTS

| GB | 2418806 A | 4/2006 |
|---|---|---|
| GB | 2427788 A | 1/2007 |

(Continued)

OTHER PUBLICATIONS

PCT International Search Report, dated Aug. 20, 2014, in connection with International Application No. PCT/EP2013/075095, all pages.
(Continued)

*Primary Examiner* — Vladimir Magloire
*Assistant Examiner* — Jaime Holliday
(74) *Attorney, Agent, or Firm* — Leffler Intellectual Property Law, PLLC (57) ABSTRACT

There is provided mechanisms for determining Universal Terrestrial Radio Access (UTRA) environment for a wireless terminal (WT). The WT supports operation in both a UTRA frequency-division duplexing (UTRA-FDD) environment and a UTRA time-division duplexing (UTRA-TDD) environment. The WT acquires a need for determining its UTRA environment. The WT determines its UTRA environment based on network information received by the WT. The (Continued)

network information indicates if the WT is in the UTRA-FDD environment or in the UTRA-TDD environment.

14 Claims, 7 Drawing Sheets

(51) Int. Cl.
| | | |
|---|---|---|
| *H04L 5/14* | (2006.01) | |
| *H04W 72/00* | (2009.01) | |
| *H04W 24/10* | (2009.01) | |
| *H04W 36/14* | (2009.01) | |
| *H04W 72/04* | (2009.01) | |
| *H04W 99/00* | (2009.01) | |
| *H04W 28/16* | (2009.01) | |
| *H04W 48/18* | (2009.01) | |
| *H04W 48/12* | (2009.01) | |
| *H04W 84/04* | (2009.01) | |
| *H04W 88/02* | (2009.01) | |

(52) U.S. Cl.
CPC .......... *H04W 72/005* (2013.01); *H04W 24/10* (2013.01); *H04W 28/16* (2013.01); *H04W 36/0055* (2013.01); *H04W 36/14* (2013.01); *H04W 48/12* (2013.01); *H04W 48/18* (2013.01); *H04W 72/04* (2013.01); *H04W 84/042* (2013.01); *H04W 88/02* (2013.01); *H04W 99/00* (2013.01)

(58) Field of Classification Search
USPC .................................. 455/422.1, 434, 435.2
See application file for complete search history.

(56) References Cited

U.S. PATENT DOCUMENTS

| | | | | |
|---|---|---|---|---|
| 2013/0301490 | A1* | 11/2013 | He ...................... | H04W 76/048 |
| | | | | 370/280 |
| 2013/0336173 | A1* | 12/2013 | Mandil ............ | H04W 36/0072 |
| | | | | 370/280 |
| 2014/0192771 | A1* | 7/2014 | Jung ..................... | H04W 36/08 |
| | | | | 370/331 |
| 2014/0254452 | A1* | 9/2014 | Golitschek ........ | H04W 52/0216 |
| | | | | 370/311 |

FOREIGN PATENT DOCUMENTS

| | | | | |
|---|---|---|---|---|
| GB | 2501937 A | * | 11/2013 | .............. H04W 8/24 |
| WO | 2013089420 A1 | | 6/2013 | |

OTHER PUBLICATIONS

PCT Written Opinion, dated Aug. 20, 2014, in connection with International Application No. PCT/EP2013/075095, all pages.

3GPP TSG-RAN WG2 Meeting #80, R2-125681, New Orleans, USA, Nov. 12-16, 2012, Renesas Mobile Europe Ltd, Broadcom Corporation, TDD or FDD capability Inter RAT Handover Info, 2 pages.

ETSI TS 125 331 V11.7.0 (Oct. 2013), Universal Mobile Telecommunications System (UMTS); Radio Resource Control (RRC); Protocol specification (3GPP TS 25.331 version 11.7.0 Release 11), 2102 pages.

* cited by examiner

DETERMINATION OF NETWORK ENVIRONMENT

TECHNICAL FIELD

Embodiments presented herein relate to network environments, and particularly to a method, a wireless device a computer program, and a computer program product for determining network environment for a wireless terminal.

BACKGROUND

In communication networks, there is always a challenge to obtain good performance and capacity for a given communications protocol, its parameters and the physical environment in which the communication network is deployed.

As an example, the standardization organization the 3rd Generation Partnership Project (3GPP) specifies the Universal Mobile Telecommunications System (UMTS) Terrestrial Radio Access (UTRA) technology consisting of two duplex modes; frequency-division duplexing (FDD) and time-division duplexing TDD. UTRA-FDD is also denoted Wideband Code Division Multiple Access (WCDMA), and UTRA-TDD is also denoted Time Division Synchronous Code Division Multiple Access (TD-SCDMA).

In general terms, the UTRA-FDD mode has been widely deployed globally whereas the UTRA-TDD mode is only deployed in one country and one operator in the world, i.e. China and the China Mobile Communications Corporation (CMCC). The China Communications Standards Association (CCSA) has published its own version of the UTRA specifications. This version differs from the 3GPP version and for the protocol layer three radio resource control (L3 RRC) message specification done in the Abstract Syntax Notation One (ASN.1) syntax the two specifications (i.e., as provided by 3GPP and CCSA) are not compatible. This may cause a situation in a wireless terminal which is configured to support both UTRA-FDD and UTRA-TDD in parallel since two different specifications for the ASN.1 must be used. The specification for the ASN.1 to be use is determined by the UTRA duplex mode.

An incorrect ASN.1 version usage will corrupt the communication with the radio base stations in the communication network. One issue concerns the selection of the correct ASN.1 specification, especially when both UTRA-FDD and UTRA-TDD are enabled and none of them are the controlling or active radio access technology (RAT) of the wireless terminal. For these cases the controlling or active RAT could be for example one of the Global System for Mobile Communications (GSM), the Long Term Evolution (LTE) wireless standard or the CDMA2000 standard.

Hence, there is a need for improved determination of network environment for a wireless terminal.

SUMMARY

An object of embodiments herein is to provide improved determination of network environment for a wireless terminal.

The inventors of the enclosed embodiments have realized that parallel support for UTRA-FDD and UTRA-TDD may imply that the radio modem in the wireless terminal will have to select what version of the ASN.1 specification to use to secure correct usage of ASN.1 encoding and decoding of L3 messages and message containers.

The inventors of the enclosed embodiments have realized that there may be at least two issues for determining UTRA environment (i.e., UTRA-FDD or UTRA-TDD) in a case the modem of the wireless terminal is active on either GSM or LTE.

For example, assume that the modem of the wireless terminal, when active on either GSM or LTE, receives a HANDOVER command to another RAT from its serving radio base station in the communication network. If the target RAT for the handover is UTRA, the only information given to the active or controlling RAT (i.e., GSM or LTE) from the network is UTRA and no specific information is included if it is UTRA-FDD or UTRA-TDD. If the wrong version is selected the modem may get decoding errors since the two ASN.1 versions are not compatible.

For example, assume that the modem of the wireless terminal, when active on either GSM or LTE, receives a request from the communication network to send the capability of the modem, on either non-access stratum (NAS) or access stratum AS level. The UTRA part must be filled in and encoded using one of the UTRA-FDD or UTRA-TDD ASN.1 versions. No information is given from the communication network related to what version of the ASN.1 specification that it supports. If the wrong version is selected the network will not be able to decode the L3 message properly as the two versions are incompatible.

A particular object is therefore to provide determination of UTRA environment for a wireless terminal.

According to a first aspect there is presented a method for determining Universal Terrestrial Radio Access (UTRA) environment for a wireless terminal (WT). The WT supports operating in both a UTRA frequency-division duplexing (UTRA-FDD) environment and a UTRA time-division duplexing (UTRA-TDD) environment. The method is performed by the WT. The method comprises acquiring a need for determining a UTRA environment of the WT. The method comprises determining the UTRA environment of the WT based on network information received by the WT. The network information indicates if the WT is in the UTRA-FDD environment or in the UTRA-TDD environment.

Advantageously this provides determination of network environment for the WT.

Advantageously this provides determination of UTRA environment for the WT.

Advantageously this resolves the issue of selecting or determining the correct ASN.1 version (associated with either UTRA-FDD or UTRA-TDD). Advantageously this may secure correct decoding and encoding of messages between the WT and the communication network and may thus ensure interoperability towards all operators that uses one of the UTRA modes.

According to an embodiment the network information is broadcasted network information. According to an embodiment the network information comprises a unicast measurement configuration.

According to a second aspect there is presented a wireless terminal (WT) for determining Universal Terrestrial Radio Access, UTRA, environment for the WT. The WT is configured for supporting operation in both a UTRA frequency-division duplexing (UTRA-FDD) environment and a UTRA time-division duplexing (UTRA-TDD) environment. The WT comprises a processing unit. The WT comprises a memory. The memory comprises instructions executable by the processing unit. The WT is operative to acquire a need for determining a UTRA environment of the WT. The WT is operative to determine the UTRA environment of the WT based on network information received by the WT. The network information indicates if the WT is in the UTRA-FDD environment or in the UTRA-TDD environment.

According to a third aspect there is presented a computer program for determining Universal Terrestrial Radio Access (UTRA) environment for a wireless terminal (WT), the computer program comprising computer program code which, when run on a WT, causes the WT to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
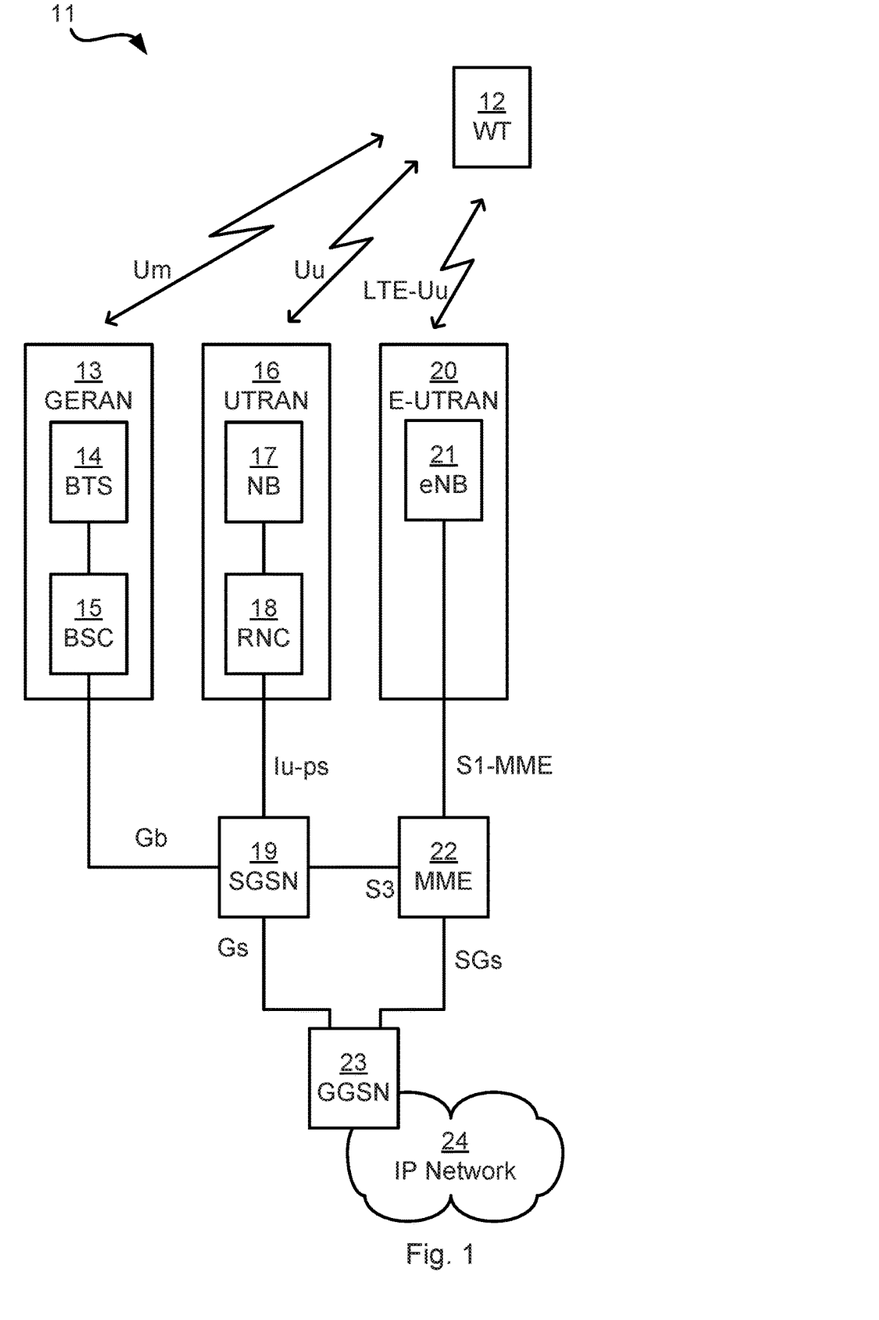
FIG. 1 is a schematic diagram illustrating a communication network according to embodiments.

FIG. 1 is a schematic diagram illustrating a communication network 11. As schematically illustrated in FIG. 1 a wireless terminal (WT) 12 is enabled to access services and content provided by an Internet Protocol (IP) network 24 in a number of different ways. The WT 12 may be one of a user equipment (UE), a mobile device, a user terminal, a user agent, a mobile phone, a so-called smart phone, a tablet computers, and other handset equipment, etc. As the skilled person understands the number of such available ways to access the network 24 generally depends on the network topology of the actual communication network used and the functionality, capability and compatibility of the WT 12.

According to the communication network 11 of FIG. 1 the WT 12 is enabled to access the IP network 24 by establishing a wireless link to one or more of a base transceiver station (BTS) 14, a NodeB (NB) 17, and an eNodeB, E-UTRAN NodeB, also known as Evolved NodeB, (eNB) 21. The WT 12 is arranged to communicate with the BTS 14 over the Um interface. The WT 12 is arranged to communicate with the NB 17 over the Uu interface. The WT 12 is arranged to communicate with the eNB 20 over the LTE-Uu interface. The radio base stations BTS 14, NB 17, and eNB 21, will collectively be referred to as network nodes. As is understood, the communication network 11 may generally comprise a plurality of network nodes 14, 17, 21 and a plurality of WT 12.

The communication network 11 is compliant with the Evolved Universal Terrestrial Radio Access Network (E-UTRAN) 20 by means of the eNB 21; typically the E-UTRAN consists only of network nodes in the form of eNBs 21 on the network side.

NodeB (NB) is a term used in UMTS (Universal Mobile Telecommunications System) equivalent to the BTS 14 description used in the Global System for Mobile Communications (GSM). For the NB 17 a radio network controller (RNC) 18 is in the Universal Terrestrial Radio Access Network (UTRAN) 16 located between the NB 17 and the SGSN 19 and the GGSN 23. The traditional NB 17 typically has minimum functionality, and is controlled by the RNC 18. The communication network 11 is thus compliant with the UTRAN by means of the NB 17 and the RNC 18.

The BTS 14 is connected to the IP network 24 via a base station controller (BSC) 15 which offers functionality according to the GSM standard in the GSM/EDGE Radio Access Network (GERAN) 13. GERAN is the term given to the second-generation digital cellular GSM radio access technology, including its evolutions in the form of EDGE (Enhanced Data rates for Global Evolution) and, for most purposes, the General Packet Radio Service (GPRS). The communication network 11 is thus compliant with the GSM, EDGE, and GPRS standards by means of the BTS 14 and the BSC 15.

The communication network 1 may thus generally comply with any combination of WCDMA (Wideband Code Division Multiple Access), TD-SCDMA (Time Division Synchronous Code Division Multiple Access), LTE (Long Term Evolution), EDGE (Enhanced Data Rates for GSM Evolution, GPRS (General Packet Radio Service)), CDMA2000 (Code Division Multiple Access 2000), etc., as long as the principles described hereinafter are applicable.

The BSC 15, RNC 18, and eNB 21 are operatively connected to the IP network 24 via a Gateway GPRS support node (GGSN) 23. The BSC 15 and the RNC 18 are connected to the GGSN 23 via a serving GPRS support node (SGSN) 19 by interfaces Gb and Iu-ps, respectively. The eNB 21 is connected to the GGSN 23 via a mobility management entity (MME) 22 by interface S1-MME. The SGSN 19 is connected to the GGSN 23 by interface Gs; the SGSN 19 and the MME 22 are connected by interface S3; the MME 22 is connected to the GGSN 23 by interface SGs.

As noted above, the UTRA technology consists of two duplex modes; frequency-division duplexing (FDD) and time-division duplexing (TDD). Situations may thus arise for a WT 12 having support for both UTRA-FDD and UTRA-TDD.

The embodiments disclosed herein relate to determination of network environment for a WT, and in particular to provide determination of the UTRA duplex mode for a WT. In order to obtain determination of the UTRA duplex mode for a WT there is provided a wireless, a method performed by the WT, a computer program comprising code, for example in the form of a computer program product, that when run on a WT, causes the WT to perform the method.

Figure 2A:
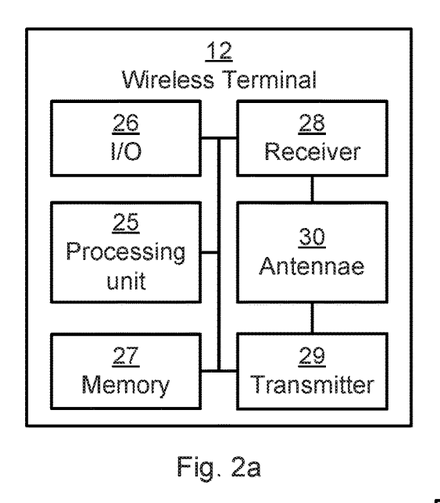
FIG. 2a is a schematic diagram showing functional modules of a wireless terminal according to an embodiment.

FIG. 2a schematically illustrates, in terms of a number of functional modules, the components of a wireless terminal (WT) 12. A processing unit 25 is provided using any combination of one or more of a suitable central processing unit (CPU), multiprocessor, microcontroller, digital signal processor (DSP), application specific integrated circuit (ASIC) etc., capable of executing software instructions stored in a computer program product 31 (as in FIG. 3), e.g. in the form of a memory 27. Thus the processing unit 25 is thereby arranged to execute methods as herein disclosed. The memory 27 may also comprise persistent storage, which, for example, can be any single one or combination of magnetic memory, optical memory, solid state memory or even remotely mounted memory.

The WT 12 may further comprise an input/output (I/O) interface 26 for receiving and providing information to a user interface. The WT 12 also comprises one or more transmitters 29 and receivers 28, comprising analogue and digital components forming the functionalities of a transmitter and a receiver, and a suitable number of antennae 30 for radio communication with the BTS 14, NB 17, and eNB 21. In this respect the WT 12 may be regarded as a so-called multi-mode wireless device. Further, the WT 12 is configured to support both UTRA-FDD and UTRA-TDD.

The processing unit 25 controls the general operation of the WT 12, e.g. by sending control signals and data signals to the transmitter 29, receiver 28, I/O interface 26 and/or memory 27 and receiving reports from the transmitter 29, receiver 28, and/or I/O 26 of its operation as well as retrieving instructions and data stored in the memory 27. Other components, as well as the related functionality, of the WT 12 are omitted in order not to obscure the concepts presented herein.

Figure 2B:
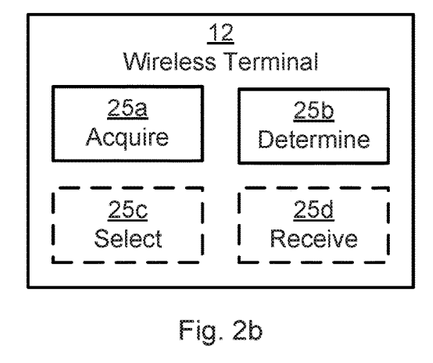
FIG. 2b is a schematic diagram showing functional units of a wireless terminal according to an embodiment.

FIG. 2b schematically illustrates, in terms of a number of functional units, the components of a WT 12 according to an embodiment. The WT 12 of FIG. 2b comprises a number of functional units; an acquire unit 25a, and a determine unit 25b. The WT 12 of FIG. 2b may further comprises a number of optional functional units, such as any of a select unit 25c, and a receive unit 25d. The functionality of each functional unit 25a-d will be further disclosed below in the context of which the functional units may be used. In general terms, each functional unit 25a-d may be implemented in hardware or in software. The processing unit 25 may thus be arranged to from the memory 27 retrieve instructions as provided by a functional unit 25a-d and to execute these instructions, thereby performing any steps as will be disclosed hereinafter.

Figure 3:
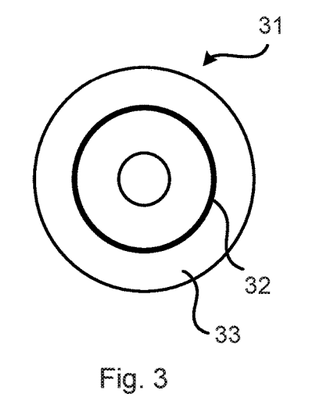
FIG. 3 shows one example of a computer program product comprising computer readable means according to an embodiment.

FIGS. 4-7 are flow chart illustrating embodiments of methods for determining UTRA environment for a WT 12. The methods are performed by the WT 12. The methods are advantageously provided as computer programs 32. FIG. 3 shows one example of a computer program product 31 comprising computer readable means 33. On this computer readable means 33, a computer program 32 can be stored, which computer program 32 can cause the processing unit 25 and thereto operatively coupled entities and devices, such as the I/O interface 26, the transmitter 29, the receiver 28, and the memory 27 to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 32 is here schematically shown as a track on the depicted optical disk, the computer program 32 can be stored in any way which is suitable for the computer program product 31.

Figures 4, 5:
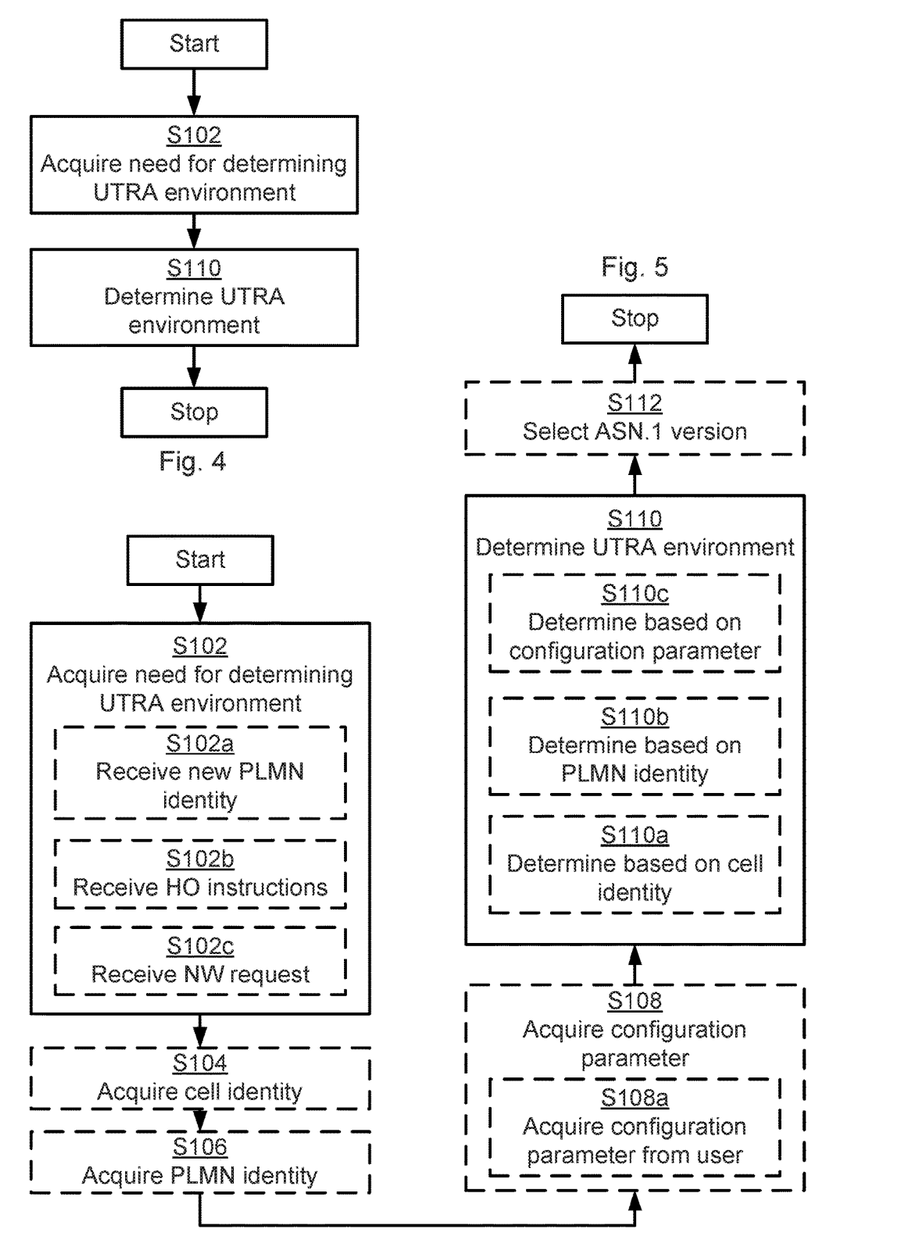
FIGS. 4, 5, 6, and 7 are flowcharts of methods according to embodiments.

Reference is now made to FIG. 4 illustrating a method for determining UTRA environment for a WT 12 according to an embodiment. It is assumed that the WT 12 is configured to support operating in both a UTRA-FDD environment and a UTRA-TDD environment. The processing unit 25 of the WT 12 is operative to, in a step S102, acquire a need for determining a UTRA environment of the WT 12. Examples of different needs will be provided below. The acquiring may be performed by executing functionality of the acquire unit 25a. The computer program 32 and/or computer program product 31 may thus provide means for this acquiring.

As a response to the need the WT 12 determine its UTRA environment. The processing unit 25 of the WT 12 is operative to, in a step Silo, determine the UTRA environment of the WT 12. The determining may be performed by executing functionality of the determine unit 25b. The computer program 32 and/or computer program product 31 may thus provide means for this determining. The processing unit 25 of the WT 12 is operative to determine the UTRA environment based on network information received by the WT 12. Examples of network information will be provided below. The network information indicates if the WT 12 is in the UTRA-FDD environment or in the UTRA-TDD environment.

There may be different kinds of network information. According to an embodiment the network information is broadcasted network information. According to an embodiment the network information comprises a unicast measurement configuration.

Embodiments relating to further details of determining UTRA environment for a WT 12 will now be disclosed. Reference is now made to FIG. 5 illustrating methods for determining UTRA environment for a WT 12 according to further embodiments.

There may be different triggers for the WT 12 to acquire the need for determining a UTRA environment of the WT 12, as in step S102 above. Different embodiments relating thereto will now be disclosed in turn.

For example, the need for determining a UTRA environment of the WT 12 may be triggered by the WT 12 moving to a cell with a new public land mobile network (PLMN) identity. According to an embodiment the processing unit 25 of the WT 12 is thus operative to, in an optional step S102a, receive an indication that the WT 12 is served by a cell with a new PLMN identity. The receiving may be performed by executing functionality of the receive unit 25a. The computer program 32 and/or computer program product 31 may thus provide means for this receiving. The step S102 of acquiring a need for determining a UTRA environment of the WT 12 may then be performed in response thereto.

The WT may served by a first radio access technology using an air interface different from UTRA For example, the need for determining a UTRA environment of the WT 12 may be triggered during handover. According to an embodiment the processing unit 25 of the WT 12 is operative to, in an optional step S102b, receive handover instructions from a network node serving the WT 12. The step S102 of acquiring a need for determining a UTRA environment of the WT 12 may then be performed in response thereto.

For example, the need for determining a UTRA environment of the WT 12 may be triggered by a network request when the WT 12 is served by a first radio access technology using an air interface different from UTRA. According to an embodiment the processing unit 25 of the WT 12 is operative to, in an optional step S102c, receive a request from a network node serving the WT to send a WT capability to the network node. The step S102 of acquiring a need for determining a UTRA environment of the WT 12 may then be performed in response thereto.

There may be different ways for the WT 12 to determine the UTRA environment of the WT 12, as in step S110. Different embodiments relating thereto will now be disclosed in turn.

For example, the WT 12 may be camping on or served by a network node 14, 21 in a first cell. For example the UTRA environment of the WT 12 may then be based on cell information from neighboring cells. Thus the WT 12 may check identity information of neighboring cells. Particularly, according to an embodiment the processing unit 25 of the WT 12 is operative to, in an optional step S104, acquire a cell identity for at least one second cell. The at least one second cell is neighboring the first cell. Each respective cell identity is associated with one of UTRA-FDD and UTRA-TDD. According to an embodiment the processing unit 25 of the WT 12 is then operative to, in an optional step S110a, determine the UTRA environment based also on the acquired cell identity.

There may be different conditions for when to perform step S104. One such condition may be to perform step S104 if the network information lacks unicast measurement configuration. One such further condition may be to perform step S104 if network information indicates neighboring cells associated with UTRA-TDD and UTRA-FDD. One such further condition may be to perform step S104 if the WT 12 is camping on or served by a network node 14, 21 in a non-UTRA cell. As will be disclosed below, there may be further different conditions for when to perform step S104.

For example the UTRA environment of the WT 12 may be based on a public land mobile network (PLMN) identity. Thus the WT 12 may check identity information of the PLMN. Particularly, according to an embodiment the processing unit 25 of the WT 12 is operative to, in an optional step S106, acquire an identity of a PLMN serving the WT 12. The identity of the PLMN may be associated with one of UTRA-FDD and UTRA-TDD. According to an embodiment the processing unit 25 of the WT 12 is operative to, in an optional step S110b, determine the UTRA environment based also on the acquired identity of the PLMN.

There may be different conditions for when to perform step S106. One such condition may be to perform step S106 if at least one cell identity associated with UTRA-FDD and at least one cell identity associated with UTRA-TDD are acquired. Another such condition may be to perform step S106 if neither a cell identity associated with UTRA-FDD nor a cell identity associated with UTRA-TDD are acquired.

There may be further different conditions for when to perform step S104. One such condition may be to perform step S104 if an identity of a PLMN is not found.

The UTRA environment of the WT 12 may be based on a configuration parameter. Thus the WT 12 may check a configuration parameter. The configuration parameter may be an internal configuration parameter. Particularly, according to an embodiment the processing unit 25 of the WT 12 is operative to, in an optional step S108, acquire a configuration parameter; and, in an optional step S110c, determine the UTRA environment based also on the acquired configuration parameter. For example, the configuration parameter may be assigned a random value. This may allow the WT 12 to first test one UTRA environment (one of UTRA-FDD and UTRA-TDD) and then another UTRA environment (the other of UTRA-FDD and UTRA-TDD). Alternatively the configuration parameter may be received as user input through the I/O interface 26. According to an embodiment the processing unit 25 of the WT 12 is thus operative to, in an optional step S108a acquire the configuration parameter from user interaction. A user may thereby manually input which UTRA environment for the WT 12 to use, thereby overriding any determination made by the WT 12 itself.

There may be different conditions for when to acquire the configuration parameter, as in step S108. One such condition may be to perform step S108 if at least one cell identity associated with UTRA-FDD and at least one cell identity associated with UTRA-TDD are acquired and if the identity of a PLMN is not found. Another such condition may be to perform step S108 if neither a cell identity associated with UTRA-FDD nor a cell identity associated with UTRA-TDD are acquired and if the identity of a PLMN is not found.

The herein disclosed inventive concept may be used to select the correct ASN.1 version to use when encoding/decoding UTRA messages/containers. This involves determining if the WT 12 is in a UTRA-FDD or UTRA-TDD environment and based on this select the correct ASN.1 version to use. According to an embodiment the processing unit 25 of the WT 12 is operative to, in an optional step S112, select an ASN.1 version corresponding to the determined UTRA environment. The selecting may be performed by executing functionality of the select unit 25c. The computer program 32 and/or computer program product 31 may thus provide means for this selecting.

Figure 6:
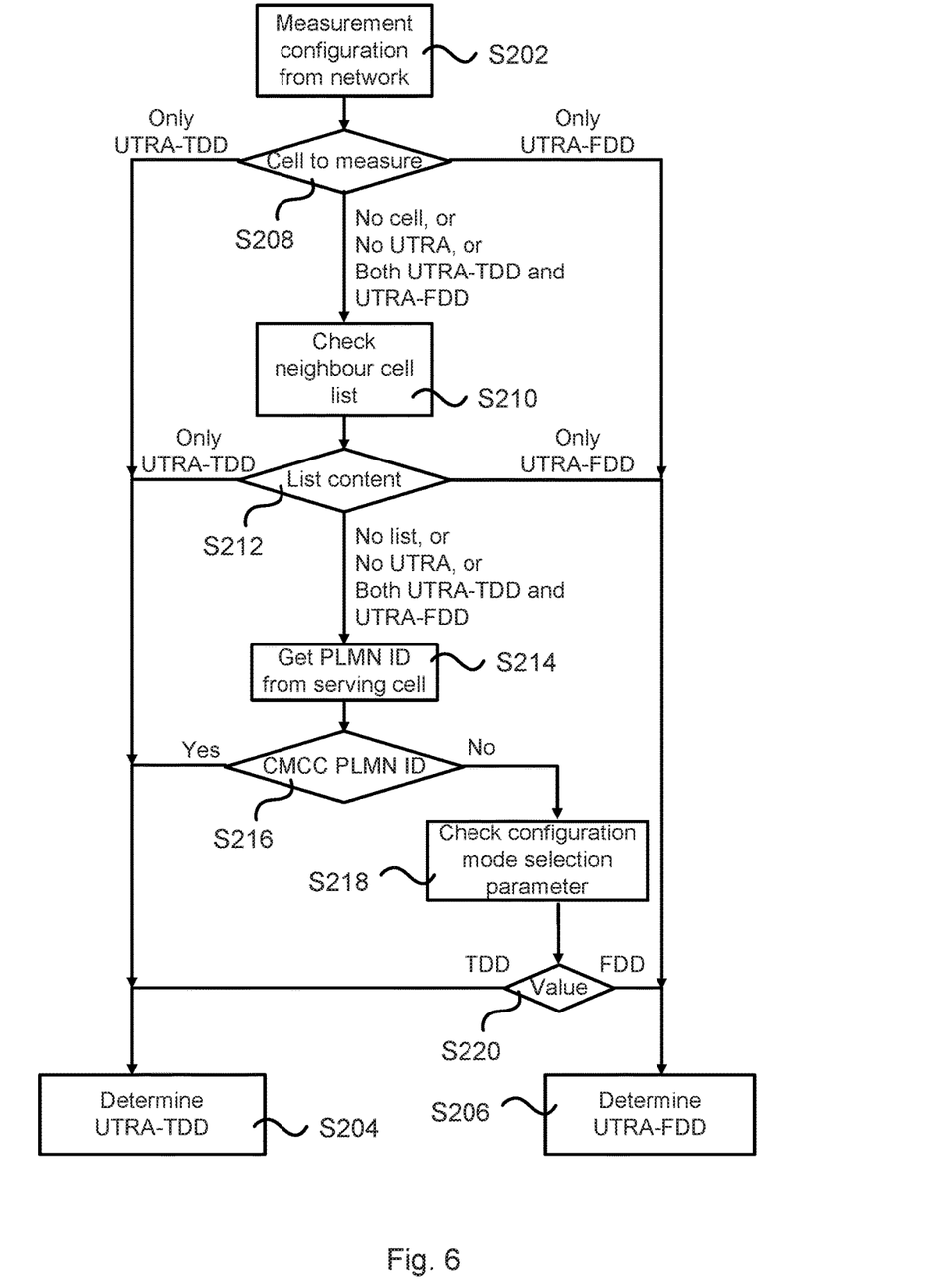

FIG. 6 is a flowchart of an embodiment for determining UTRA environment for a WT 12.

Step S202: Receive measurement configuration from the network.

Step S208: Check if there is a cell to measure from. If the measured cell is UTRA-TDD, then the ASN.1 version for UTRA-TDD is used for encoding/decoding (step S204). If the measured cell is UTRA-FDD, then the ASN.1 version for UTRA-FDD is used for encoding/decoding (step S26). If there is no measurement configuration, no UTRA cells to measure, or measured cells exist for both UTRA-TDD and UTRA-FDD, continue to step 210.

Step S210: Check neighbor cell list, continue to step 212.

Step S212: If only neighbor cells of one of UTRA-TDD (step S204) or UTRA-FDD (step S206) is present then that ASN.1 version is used. Else if there are no neighbor cells, no UTRA neighbor cells exist, or neighbor cells exist for both UTRA-TDD and UTRA-FDD, continue to step 214.

S214: Acquire PLMN ID from serving cell, continue to step 216.

S216: Check PLMN ID of the serving cell and if equal to one of the identities used by mainland China operator CMCC then select ASN.1 version corresponding to UTRA-TDD (step S204). Else, continue to step S218.

S218: Check a configuration mode selection parameter, continue to step S220.

S220: Select ASN.1 version corresponding to UTRA-TDD (step S204) or UTRA-FDD (step S206) based on a value of the internal configuration parameter. The internal configuration parameter may have been received as network information during initial configuration of the WT.

Figure 7:
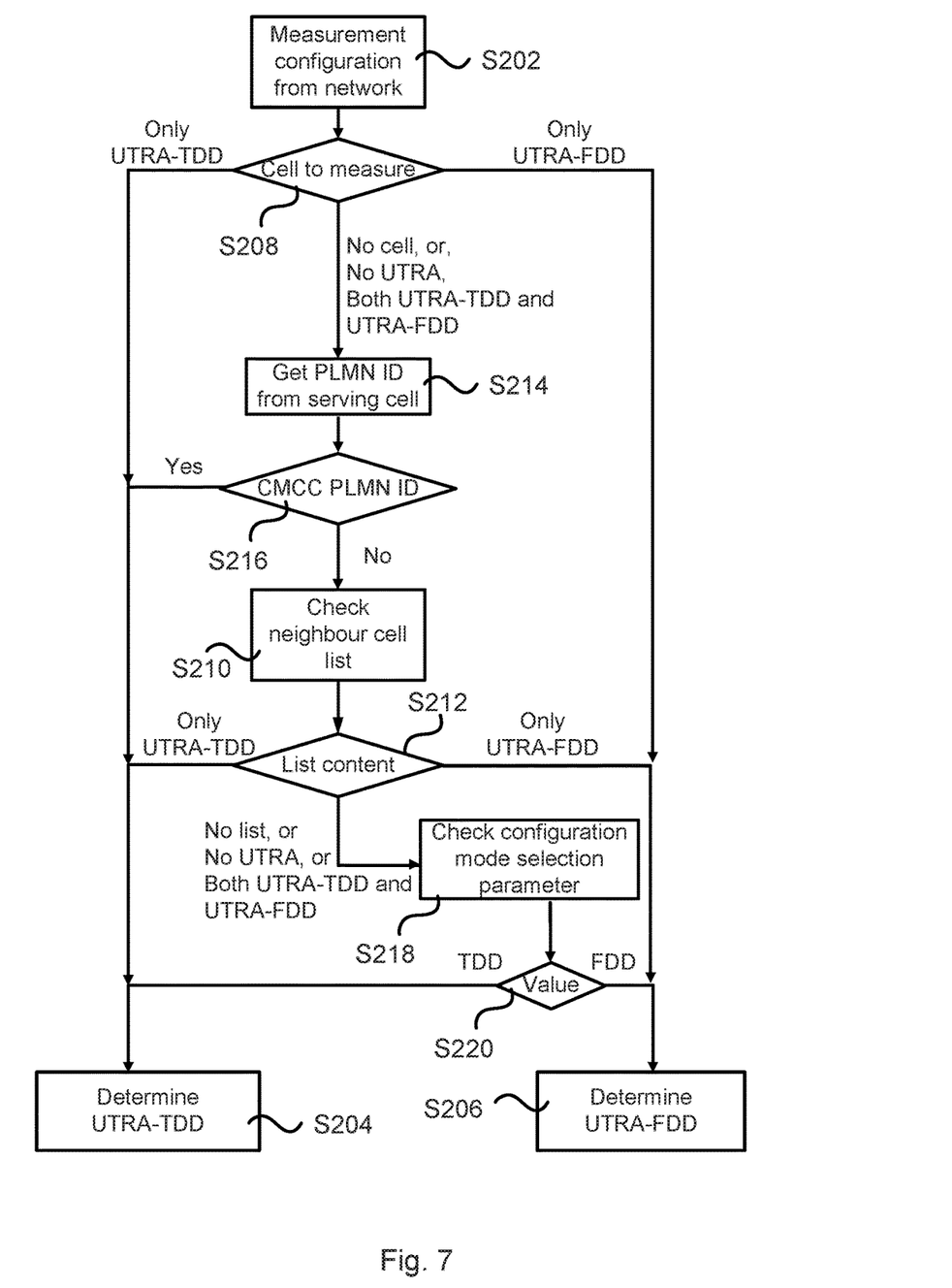

FIG. 7 is a flowchart of an embodiment for determining UTRA environment for a WT 12. In relation to the flowchart of FIG. 6 some of the steps of the flowchart of FIG. 7 are performed in a different order.

Step S202: Receive measurement configuration from the network.

Step S208: Check if there is a cell to measure from. If the measured cell is UTRA-TDD, then the ASN.1 version for UTRA-TDD is used for encoding/decoding (step S204). If the measured cell is UTRA-FDD, then the ASN.1 version for UTRA-FDD is used for encoding/decoding (step S206). If there is no measurement configuration, no UTRA cells to measure, or measured cells exist for both UTRA-TDD and UTRA-FDD, continue to step 214.

S214: Acquire PLMN ID from serving cell, continue to step 216.

S216: Check PLMN ID of the serving cell and if equal to one of the identities used by mainland China operator CMCC then select ASN.1 version corresponding to UTRA-TDD (step S204). Else, continue to step S210.

Step S210: Check neighbor cell list, continue to step 212.

Step S212: Check neighbor cell list. If only neighbor cells of one of UTRA-TDD (step S204) or UTRA-FDD (step S206) is present then that ASN.1 version is used. Else if there are no neighbor cells, no UTRA neighbor cells exist, or neighbor cells exist for both UTRA-TDD and UTRA-FDD, continue to step 218.

S218: Check a configuration mode selection parameter, continue to step S220.

S220: Select ASN.1 version corresponding to UTRA-TDD (step S204) or UTRA-FDD (step S206) based on a value of the internal configuration parameter. The internal configuration parameter may have been received as network information during initial configuration of the WT.

Step S220 may be used, for example, for test environments where the PLMN ID can be of any unknown value. It may also be needed for cases where it is impossible for the WT 12 to implicitly decide UTRA environment according to steps 208 and 212 above.

Steps 202-220 may be performed by the WT 12. The memory 27 may thus comprise such instructions executable by the processing unit 25 and enabling the WT 12 to perform these steps.

Two overall embodiments relating to determining UTRA environment for a WT 12 will now be disclosed in turn.

Figure 8:
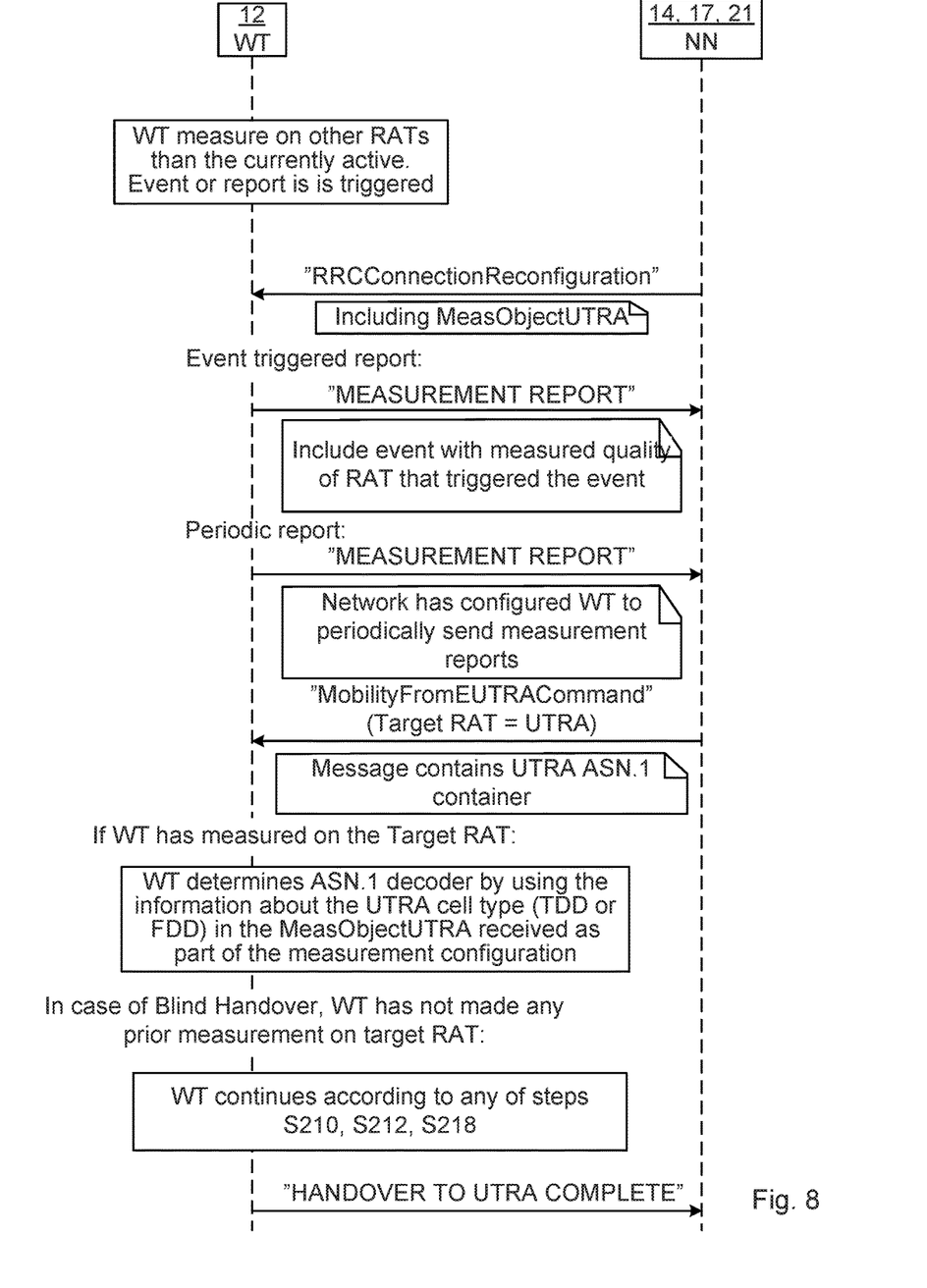
FIGS. 8 and 9 are sequence diagrams of methods according to embodiments.

Reference is now made to the sequence diagram of FIG. 8 relating to a first overall embodiment. The first overall embodiment is based on a scenario where the WT 12 is active in GSM (i.e., served by the BTS 14) or LTE (i.e., served by the eNB 21) and receives a handover command including a message container that is ASN.1 encoded according to an unknown version of the specification (3GPP or CCSA).

When the WT 12 is active in a non-UTRA RAT (e.g., GSM or LTE) it may receive a handover command/message that instructs the WT 12 to move (handover) from its current serving cell (e.g., GSM or LTE) to a UTRA cell (to be served by a NB 17). This message is coded in the active RAT (e.g., GSM or LTE) but includes an octet string that is encoded according to the ASN.1 specification for UTRA. The handover command/message coming from the network may be triggered by measurements of signal strength performed by the WT 12 on several frequencies/cells in the UTRA that are reported through the active cell in the non-UTRA RAT (e.g., GSM or LTE). The reported measurements may either be sent periodically to the network or may be triggered by an event, e.g., that the signal strength on a specific measured cell/frequency exceeds a threshold value. In the sequence diagram of FIG. 8 the start of the measurement is triggered by a command/message from the network denoted "RRC-ConnectionReconfigure" and the measurement results are sent from the WT 12 to the network in a message denoted as the "MEASUREMENT REPORT". The information from the measurement is not always used or needed. This means that the handover could also be triggered from the network by means of other properties. For example the network may have information indicating that the WT 12 is located in a location where there is good UTRA coverage (according to some criterion) and due to load in the non-UTRA cell the network may request WT 12 to be move over to a UTRA cell. This is denoted as a "blind" handover. In general terms, by "blind" handover is meant handover when no measurement have been performed on the target cell (or RAT).

When determining which ASN.1 specification to choose from for the decoding the WT 12 may first (if available) use the information of what cells it has measured to select the correct ASN.1 specification to perform the decoding, as in steps S202, S208. If that is not possible the WT 12 may continue to check if there is a neighbor cell list, as in step S210, that may be used and base the determination of used ASN.1 on if there is TDD or FDD cells present in that list, as in step S212. If this is not possible the registered PLMN ID or the PLMN ID obtained from the serving cell before entering connected mode may be accessed, as in step S214, and checked, as in S216, towards a list of known CMCC PLMN codes and if there is a match the CCSA ASN.1 is selected. If still there is no determination possible a configuration parameter may be checked, as in step S218, and a value thereof may be used, as in step S220, to select the correct ASN.1 version.

Figure 9:
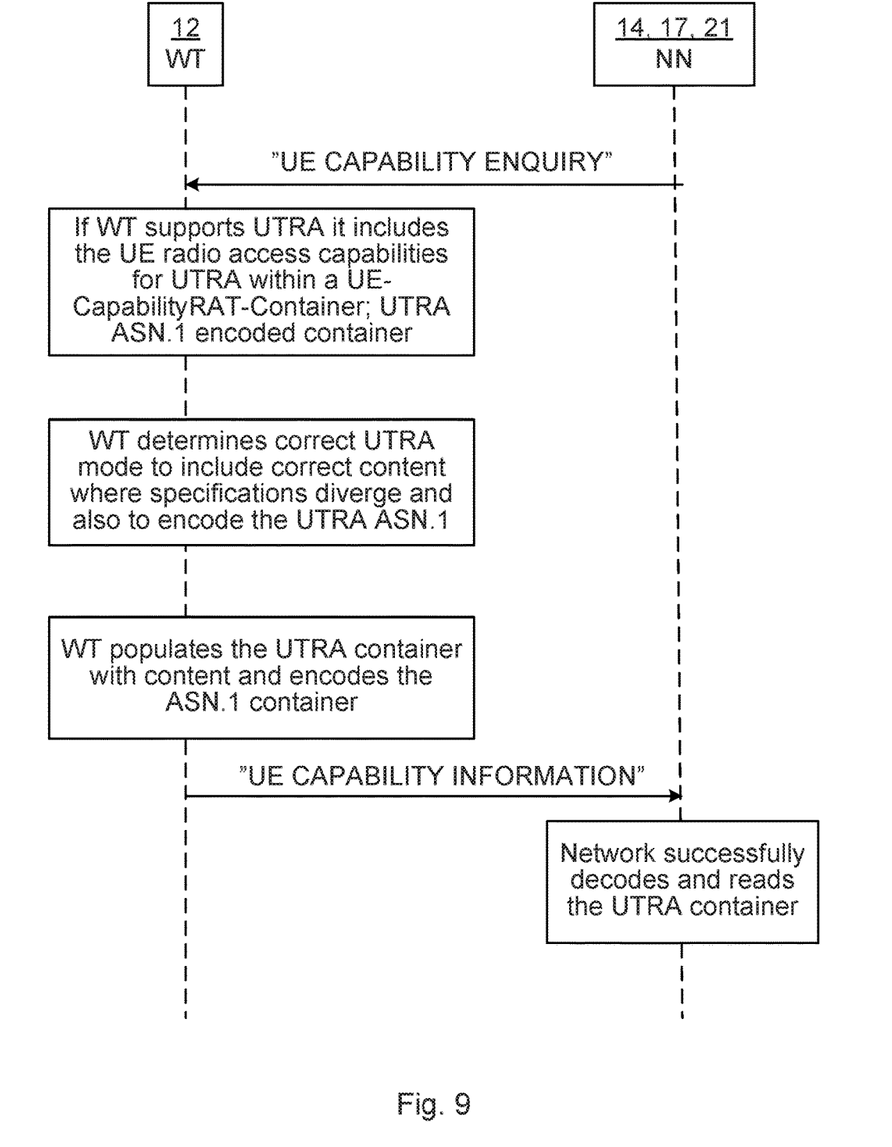

Reference is now made to the sequence diagram of FIG. 9 relating to a second overall embodiment. The second overall embodiment is based on a scenario where the WT 12 is active in GSM (i.e., served by the BTS 14) or LTE (i.e., served by the eNB 21) and is requested to encode UTRA radio access capabilities into a message container according to one of the ASN.1 specifications.

When the WT 12 is active in a non-UTRA cell it may need to report the UTRA radio access capabilities to the network. The reporting could be triggered by a message from the network or be part of the registration procedure of the WT 12 to the network. In addition this could also be performed on different protocol levels, e.g. NAS (Non-Access Stratum) or AS (Access Stratum) protocol levels. The UTRA radio access capabilities are encoded into a message container according to the ASN.1 notation from the specification.

In the sequence diagram of FIG. 9 an example is shown where an E-UTRA network sends a message to the WT 12 to request the WT 12 to send its radio access capabilities. This is done in a message called "UE CAPABILITY ENQUIRY". This is described in more detail in TS 36.331, section 5.6.3. As part of encoding the response to this, the WT 12 needs to add the UTRA radio access capabilities in a separate container called "INTER RAT HANDOVER INFO", see for example TS 25.331, section 8.1.16.3. In TS 25.331, section 8.1.16.3 it is stated to "determine whether capabilities are being requested for FDD or TDD mode". However nothing is stated or described regarding how this determination should be performed. Although the referenced section in TS 25.331 is not related to determining what ASN.1 specification to select it is related to the step of determining if the WT 12 is in a FDD or TDD environment. According to the herein disclosed embodiments the WT 12 first checks if there is any measurement configuration, as in step S202, and then if the UTRA environment cannot be determined therefrom, checks, as in steps S08 and S210, a neighbor cell list (if available) broadcasted by the network. If determination of UTRA environment is still not possible the registered PLMN ID or the PLMN ID broadcasted from the serving cell is acquired, as in step S214, and checked, as in step S216, towards a list of known CMCC PLMN codes and if there is a match the CCSA ASN.1 specification is selected. If still there is no determination possible a configuration parameter may be checked, as in step S218, and a value thereof may be used, as in step S220, to select the correct ASN.1 version.

Although this second overall embodiment refers to the E-UTRA case, there are similar cases where the "INTER RAT HANDOVER INFO" needs to be encoded. Examples include, but are not limited to, situations described for GSM in TS 44.018, section 3.4.11, and for NAS protocols in TS 24.008, section 10.5.5.24. For these cases the same mechanisms as for the second overall embodiment to determine what ASN.1 specification to select may be applied.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, in the two disclosed overall embodiments concrete examples were provided for when and how the ASN.1 specification selection to encode/decode messages to/from the communication network may be performed by the WT 12. As part of these the UTRA-TDD or UTRA-FDD environment was determined by the WT 12 being configured to perform a number of steps. There may also be other situations where there may be a need for the WT 12 to act differently based on the UTRA-TDD or UTRA-FDD environment. One example includes, but is not limited to, scenarios relating to loading/unloading of software components from the memory 27 in the WT 12. Another example includes, but is not limited to, scenarios relating to the use of different values of a timer that upon expiry triggers some event, action, or the like in the WT 12. Thus, the same mechanisms as described above could be used whenever there are two different actions/behaviors needed and these are given by if the WT 12 is in a UTRA-FDD or a UTRA-TDD environment.

ABBREVIATIONS

UMTS—Universal Mobile Telecommunications System
UTRA—UMTS (or Universal) Terrestrial Radio Access
FDD—Frequency Division Duplex
TDD—Time Division Duplex
ASN.1—Abstract Syntax Notation One
PLMN—Public Land Mobile Network
WCDMA—Wideband Code Division Multiple Access
TDSCDMA—Time Division Synchronous Code Division Multiple Access
NS—Network Signaling

The invention claimed is:

1. A method for determining Universal Terrestrial Radio Access (UTRA) environment for a wireless terminal (WT) that supports operating in both a UTRA frequency-division duplexing (UTRA-FDD) environment and a UTRA time-division duplexing (UTRA-TDD) environment, the method being performed by the WT and comprising the steps of:
acquiring a need for determining a UTRA environment of the WT, wherein said WT is camping on or served by a network node in a first cell;
attempting to acquire an identity of a public land mobile network (PLMN) serving the WT, wherein said identity of said PLMN is associated with one of UTRA-FDD and UTRA-TDD;
if said identity of a PLMN is not acquired, then acquiring a cell identity for at least one second cell, the at least one second cell neighbouring said first cell, wherein each respective cell identity is associated with one of UTRA-FDD and UTRA-TDD; and
determining said UTRA environment of the WT based on network information received by the WT, said network information indicating if the WT is in the UTRA-FDD environment or in the UTRA-TDD environment, and based also on at least one of said acquired cell identity and said acquired identity of said PLMN.

2. The method according to claim 1, wherein said network information is broadcasted network information.

3. The method according to claim 1, wherein said network information comprises a unicast measurement configuration.

4. The method according to claim 1, wherein said step of acquiring a cell identity only is performed if either said network information lacks unicast measurement configuration, or if said network information indicates neighbouring cells associated with UTRA-TDD and UTRA-FDD.

5. The method according to claim 1, further comprising:
acquiring a configuration parameter; and
determining said UTRA environment based also on said acquired configuration parameter.

6. The method according to claim 5, wherein said step of acquiring a configuration parameter only is performed if either at least one cell identity associated with UTRA-FDD and at least one cell identity associated with UTRA-TDD are acquired and if said identity of a PLMN is not acquired, or if neither a cell identity associated with UTRA-FDD nor a cell identity associated with UTRA-TDD are acquired and if said identity of a PLMN is not acquired.

7. The method according to claim 5, wherein said configuration parameter is assigned a random value.

8. The method according to claim 5, further comprising: acquiring said configuration parameter from user interaction.

9. The method according to claim 1, further comprising: selecting an abstract syntax notation one, ASN.1, version corresponding to said determined UTRA environment.

10. The method according to claim 1 further comprising:
receiving an indication that the WT is served by a cell with a new PLMN identity;
and performing said step of acquiring a need for determining a UTRA environment of the WT in response thereto.

11. The method according to claim 1, wherein the WT is served by a first radio access technology using an air interface different from UTRA, the method further comprising:

receiving handover instructions from a network node serving the WT;

and performing said step of acquiring a need for determining a UTRA environment of the WT in response thereto.

12. The method according to claim 1, wherein the WT is served by a first radio access technology using an air interface different from UTRA, the method further comprising:

receiving a request from a network node serving the WT to send a WT capability to the network node;

and performing said step of acquiring a need for determining a UTRA environment of the WT in response thereto.

13. A wireless terminal, WT, for determining Universal Terrestrial Radio Access, UTRA, environment for the WT, the WT being configured for supporting operation in both a UTRA frequency-division duplexing, UTRA-FDD, environment and a UTRA time-division duplexing, UTRA-TDD, environment, the WT comprising a processing unit and a memory, said memory comprising instructions executable by said processing unit whereby said WT is operative to:

acquire a need for determining a UTRA environment of the WT, wherein said WT is camping on or served by a network node in a first cell;

attempt to acquire an identity of a public land mobile network (PLMN) serving the WT, wherein said identity of said PLMN is associated with one of UTRA-FDD and UTRA-TDD;

if said identity of a PLMN is not acquired, then acquire a cell identity for at least one second cell, the at least one second cell neighbouring said first cell, wherein each respective cell identity is associated with one of UTRA-FDD and UTRA-TDD; and determine said UTRA environment of the WT based on network information received by the WT, said network information indicating if the WT is in the UTRA-FDD environment or in the UTRA-TDD environment, and based also on at least one of said acquired cell identity and said acquired identity of said PLMN.

14. A nontransitory computer readable storage medium comprising a computer program for determining Universal Terrestrial Radio Access (UTRA) environment for a wireless terminal (WT) that supports operating in both a UTRA frequency-division duplexing (UTRA-FDD) environment and a UTRA time-division duplexing (UTRA-TDD) environment, the computer program comprising computer program code which, when run on the WT, causes the WT to:

acquire a need for determining a UTRA environment of the WT, wherein said WT is camping on or served by a network node in a first cell;

attempt to acquire an identity of a public land mobile network (PLMN) serving the WT, wherein said identity of said PLMN is associated with one of UTRA-FDD and UTRA-TDD;

if said identity of a PLMN is not acquired, then acquire a cell identity for at least one second cell, the at least one second cell neighbouring said first cell, wherein each respective cell identity is associated with one of UTRA-FDD and UTRA-TDD; and determine said UTRA environment of the WT based on network information received by the WT, said network information indicating if the WT is in the UTRA-FDD environment or in the UTRA-TDD environment, and based also on at least one of said acquired cell identity and said acquired identity of said PLMN.

* * * * *